(12) United States Patent
Naroff et al.

(10) Patent No.: US 8,291,395 B2
(45) Date of Patent: Oct. 16, 2012

(54) FAST FUNCTION CALL DISPATCHING

(75) Inventors: Steve Naroff, San Jose, CA (US); Blaine Garst, Los Altos, CA (US); Greg Parker, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1568 days.

(21) Appl. No.: 11/394,758

(22) Filed: Mar. 31, 2006

(65) Prior Publication Data

US 2007/0234289 A1    Oct. 4, 2007

(51) Int. Cl.
*G06F 9/45* (2006.01)
*G06F 9/44* (2006.01)

(52) U.S. Cl. ......... 717/151; 717/152; 717/153; 717/163

(58) Field of Classification Search .................... 717/151
See application file for complete search history.

(56) References Cited

U.S. PATENT DOCUMENTS

| | | | | |
|---|---|---|---|---|
| 5,615,400 A * | 3/1997 | Cowsar et al. | 719/332 |
| 5,960,197 A * | 9/1999 | Segnan | 717/116 |
| 5,987,529 A * | 11/1999 | Nakamura et al. | 717/328 |
| 6,006,278 A * | 12/1999 | Cottrill | 719/330 |
| 6,014,518 A * | 1/2000 | Steensgaard | 717/154 |
| 6,138,269 A * | 10/2000 | Ball et al. | 717/108 |
| 6,256,775 B1 * | 7/2001 | Flynn | 717/127 |
| 6,292,843 B1 * | 9/2001 | Romano | 719/331 |
| 6,317,796 B1 * | 11/2001 | Bak et al. | 719/315 |
| 6,385,660 B2 * | 5/2002 | Griesemer et al. | 719/315 |
| 6,427,234 B1 * | 7/2002 | Chambers et al. | 717/140 |
| 6,499,137 B1 * | 12/2002 | Hunt | 717/164 |
| 6,704,927 B1 * | 3/2004 | Bak et al. | 717/151 |
| 6,996,804 B2 * | 2/2006 | Stoodley | 717/116 |
| 7,003,507 B2 * | 2/2006 | Tip et al. | 1/1 |
| 7,007,005 B2 * | 2/2006 | Rautenback et al. | 1/1 |
| 7,058,929 B2 * | 6/2006 | Charnell et al. | 717/135 |
| 7,137,123 B2 * | 11/2006 | Bak et al. | 719/315 |
| 7,316,010 B1 * | 1/2008 | Daynes et al. | 717/140 |
| 7,373,398 B2 * | 5/2008 | McIlroy | 709/221 |
| 7,526,502 B2 * | 4/2009 | Hall et al. | 1/1 |
| 7,526,760 B1 * | 4/2009 | Daynes et al. | 717/153 |
| 7,665,075 B1 * | 2/2010 | Daynes et al. | 717/148 |
| 7,665,079 B1 * | 2/2010 | Yasue et al. | 717/160 |
| 2001/0011306 A1 * | 8/2001 | Griesemer et al. | 709/315 |
| 2002/0144060 A1 * | 10/2002 | Stoodley | 711/118 |

(Continued)

OTHER PUBLICATIONS

Zendra et al., "Efficient Dynamic Dispatch without Virtual Function Table. The SmallEiffel Compiler",1997, retrieved from <http://delivery.acm.org/10.1145/270000/263728/p125-zendra.pdf?key1=263728&key2=2387630721&coll=GUIDE&dl=GUIDE&CFID=82812966&CFTOKEN=75793509> pp. 125-141.*

(Continued)

*Primary Examiner* — Don Wong
*Assistant Examiner* — Marina Lee
(74) *Attorney, Agent, or Firm* — Blakely, Sokoloff, Taylor & Zafman LLP (57) ABSTRACT

Methods and apparatus, including computer program products, for locating a function call site in a code segment of a running application, the code segment including a plurality of instructions. The call site is the location of an invocation of a function and includes a first reference, the first reference being a reference to a first dispatcher. The call site in the code segment is modified by replacing the first reference with a second reference, the second reference being a reference to second dispatcher, the second dispatcher different from the first dispatcher.

15 Claims, 10 Drawing Sheets

U.S. PATENT DOCUMENTS

| | | | |
|---|---|---|---|
| 2003/0018603 A1* | 1/2003 | Tip et al. | 707/1 |
| 2004/0015912 A1* | 1/2004 | Bottomley | 717/148 |
| 2004/0040029 A1* | 2/2004 | Debbabi et al. | 719/315 |
| 2004/0085948 A1* | 5/2004 | Cabana | 370/352 |
| 2004/0123308 A1* | 6/2004 | Idoni | 719/331 |
| 2004/0154008 A1* | 8/2004 | Bak et al. | 717/151 |
| 2004/0244009 A1* | 12/2004 | Bak et al. | 719/315 |
| 2005/0097530 A1* | 5/2005 | Asao et al. | 717/140 |
| 2005/0204361 A1* | 9/2005 | Heeb | 719/315 |
| 2006/0059195 A1* | 3/2006 | Hall et al. | 707/103 Y |
| 2006/0164269 A1* | 7/2006 | Trimbell et al. | 341/106 |
| 2006/0242654 A1* | 10/2006 | Lund et al. | 719/331 |

OTHER PUBLICATIONS

Karel Driesen, "Software and Hardwae Techniques for Efficient Polymorphic Calls", Jun. 1999, retrieved from <http://www.cs.ucsb.edu/~urs/oocsb/papers/TRCS99-24.pdf>, total pages: 204.*

Sundaresan et al., "Experiences with Multi-threading and Dynamic Class Loading in a Java Just-In-Time Compiler",© 2006 IEEE, Retrieved from <http://delivery.acm.org/10.1145/1130000/1122395/24990087.pdf?ip=151.207.246.4&acc=ACTIVE%20-SERVICE&CFID=113561003&CFTOKEN=88513067&_acm_=1339917087_2cab85357f39c678763d3c63181d5127> total pages 11.*

Leone, et al., *Dynamo: A Staged Compiler Architecture for Dynamic Program Optimization*, Indiana University Computer Science Department, Technical Report #490, Sep. 1997, pp. 1-17.

Dynamic dispatch, [online],[retrieved on Oct. 5, 2006]. Retrieved from the Internet<URL: http://en.Wikipedia.org/w/index.php?title=Dynamic_dispatch&printab . . . .

Java Virtual Machine, [online],[retrieved on Oct. 5, 2006]. Retrieved from the Internet<URL: http://en.Wikipedia.org/w/index.php?title=Java_Virtual_Machine&pri . . . .

Just-in-time compilation, [online],[retrieved on Oct. 5, 2006]. Retrieved from the Internet<URL: http://en.Wikipedia.org/w/index.php?title=Just-in-time_compilation&p . . . .

Objective-C, [online],[retrieved on Oct. 5, 2006]. Retrieved from the Internet<URL: http://en.Wikipedia.org/w/index.php?title=Objective-C&printable=yes.

Virtual method table, [online],[retrieved on Oct. 5, 2006]. Retrieved from the Internet<URL: http://en.Wikipedia.org/w/index.php?title=Virtual_method_table&prin . . . .

* cited by examiner

FAST FUNCTION CALL DISPATCHING

BACKGROUND

Figure 1A:
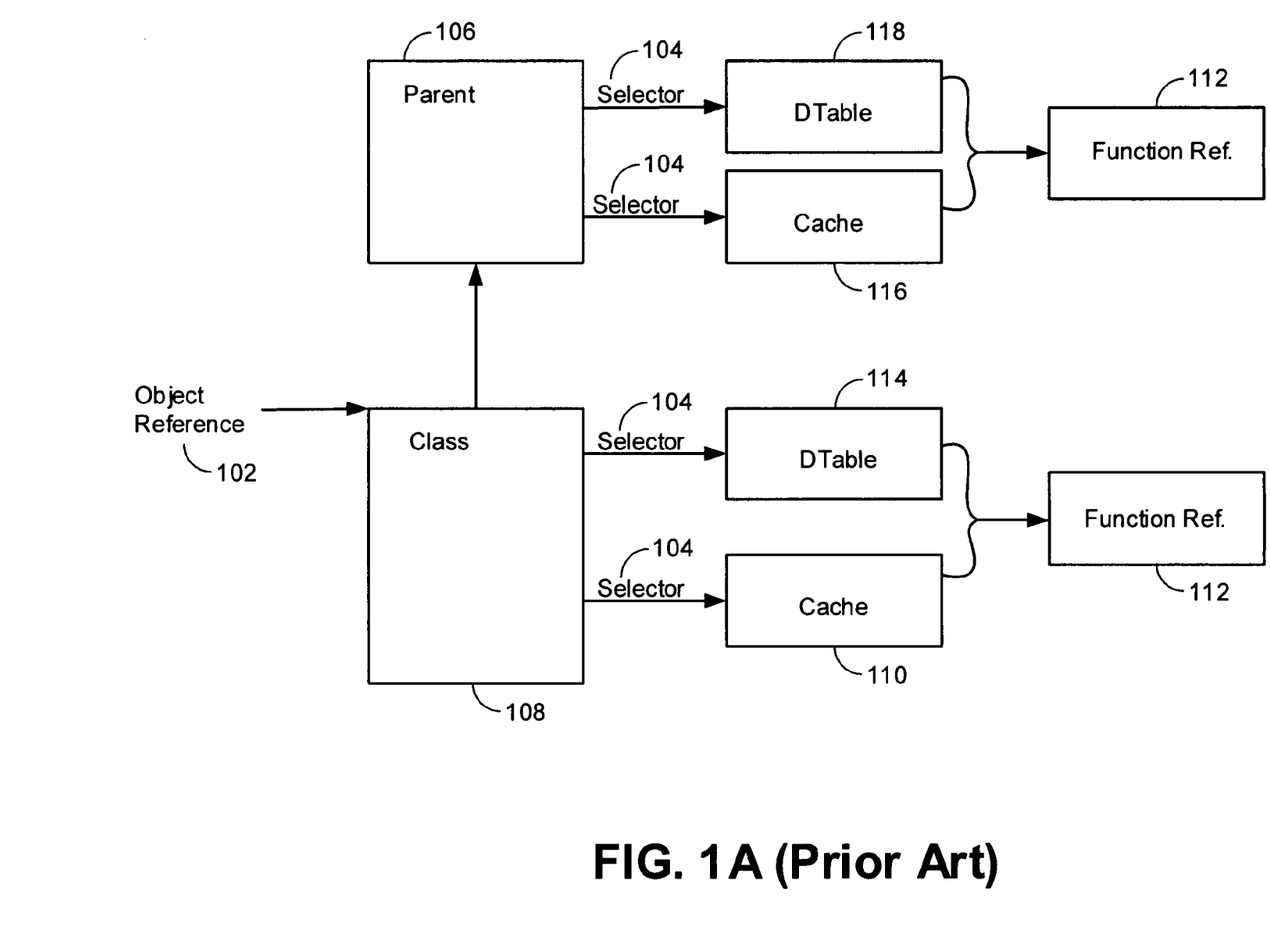
FIGS. 1A and 2 illustrate prior art cache-based function call dispatching techniques.
Figure 1B:
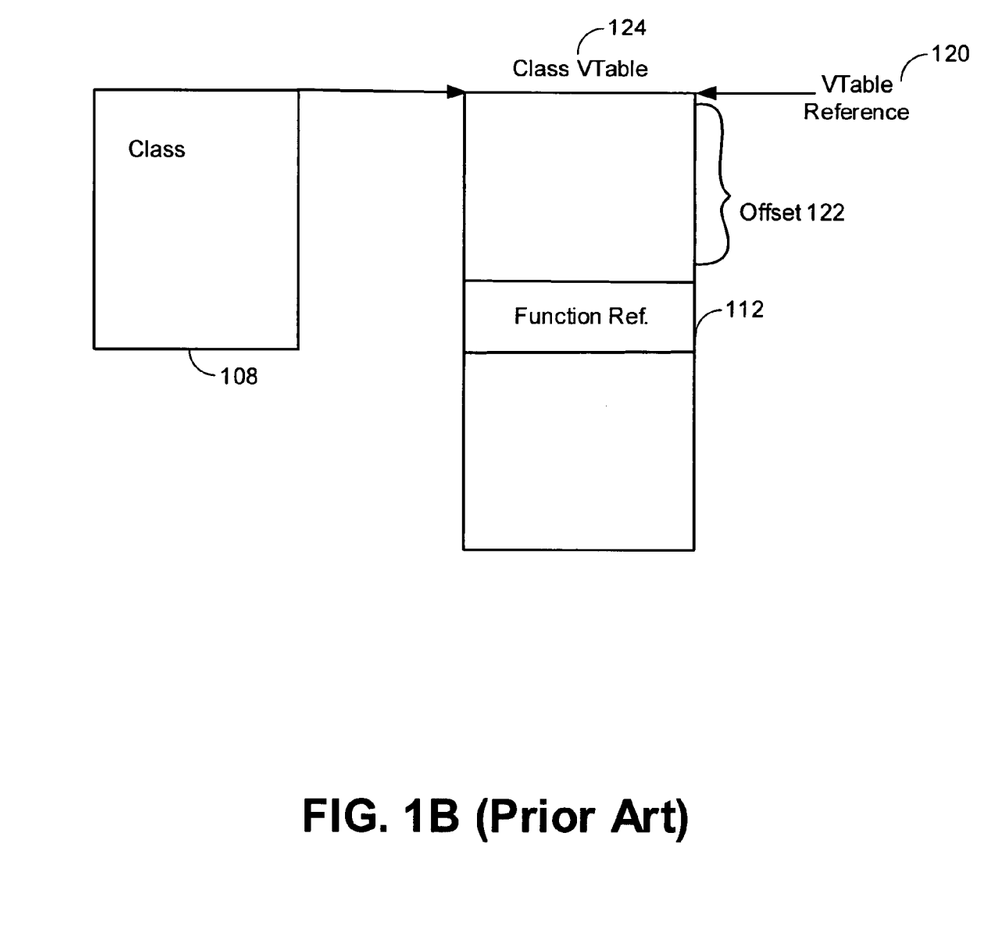
FIGS. 1B and 3 illustrate prior art vtable function call dispatching techniques.

FIGS. 1A and 1B illustrate two prior art techniques for calling or invoking a function. As used herein, a "function" describes a polymorphic or monomorphic procedure, subroutine or method. A polymorphic function has more than one implementation in a running program and a monomorphic function has a single implementation. For example, if a class A defines a function foo, and there are no subclasses of that class that also define foo, then foo is a monomorphic function. Alternatively, foo can be defined outside of a class. For example, foo may be defined at a first namespace scope. If there are no other definitions of foo in namespace scopes nested with the first scope, then foo is monomorphic. If a subclass of A (or a nested scope) defines foo, then foo is polymorphic since foo has more than one implementation in A's class lineage (or in the namespace hierarchy).

In the computing arts, and for the purposes of these discussions, an object can be defined as an instance of a class. A function can be invoked on an object directly or through a reference to the object. A reference to an object, function or other entity can be a relative, absolute or symbolic location of the entity in a memory location or a data structure.

Figure 2:
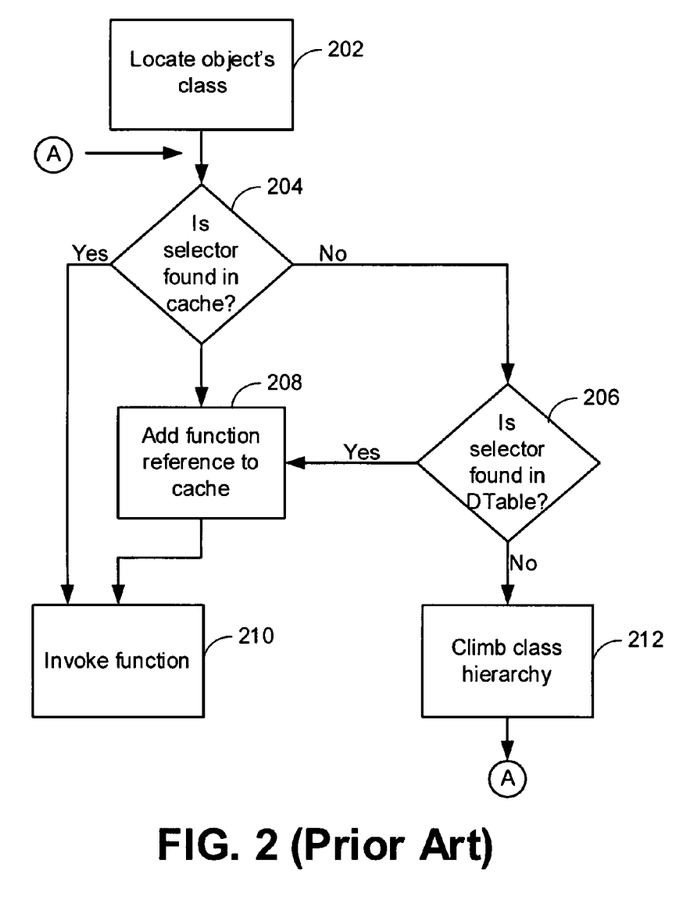

FIGS. 1A and 2 illustrate a prior art cache-based polymorphic function call dispatching technique. Cache-based dispatching is used, for example, in applications written in the Objective-C programming language. Typically, each class can have an associated function cache and a dispatcher table ("dtable") which are shared by all instances of the class. The dtable is a table or a list of functions defined by the class. An object reference 102 and a selector 104 are used to invoke a function identified by the selector 104. A selector, as used herein, is a sequence of one or more letters, numbers or symbols. In one implementation, a selector includes a function name and the function's argument types. The object reference 102 is used to locate the object's class definition 108 (step 202). A determination is made as to whether the selector 104 is found in a cache 110 associated with the class definition 108 (step 204). The cache contains function references for functions that have been previously invoked. If the selector 104 is found in the cache 110, the function reference 112 associated with the selector 104 in the cache 10 is used to invoke the function (step 210).

If the selector 104 is not found in the cache 110, a dtable 114 associated with the class definition 108 is searched using the selector 104. The dtable is searched for the selector 104 (step 206). If the selector 104 is not found, the sought after function is not defined for the class 108 in which case the process repeats using a parent class (e.g., 106; step 212) until a class defining the function is found. If the selector 104 is found, the function reference 112 associated with the selector 104 in the dtable 114 is added to the cache 110 (step 208) and used to invoke the function (step 210). If the cache 110 does not exist, the cache may be created first. Subsequent invocations of the function can use the cache 110 to obtain the function reference 112.

Figure 3:
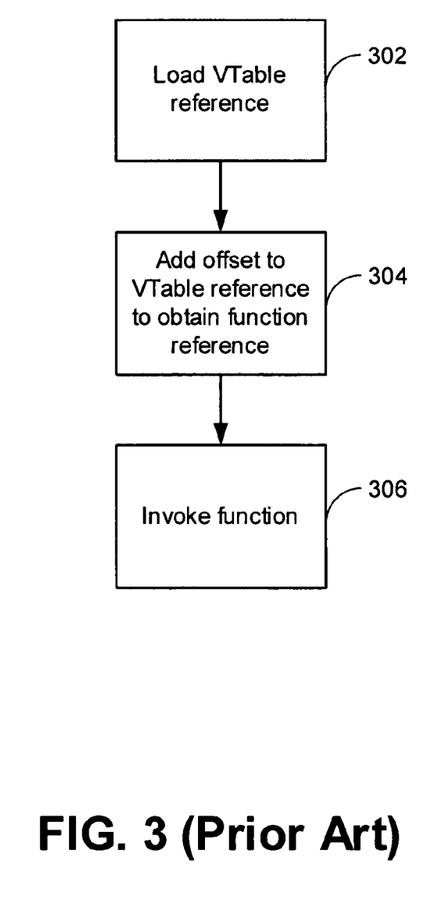

FIGS. 1B and 3 illustrate a prior art virtual function table ("vtable") polymorphic function call dispatching technique which is used, for example, in applications written in the C++ programming language. The vtable 124 is an array of function references. Typically, there is one vtable per class definition (i.e., all instances of a class share the class's vtable). To dispatch a function call a vtable reference 120 is obtained (step 302) and an offset 122 into the vtable is added to the vtable reference 120 (step 304). The sum (i.e., offset plus vtable reference) yields a location in the vtable 124 containing the particular function reference 112 which is used to invoke the function (step 306).

Each of these function call dispatching techniques has advantages and disadvantages. The cache-based technique saves runtime memory by not creating a cache for a class until a function for the class is actually invoked and only storing function references in the cache when the corresponding functions are invoked. However, invoking functions using the cache-based technique can be slower than the vtable based technique, which only involves adding two values and dereferencing the result. This is especially noticeable for frequently called functions. But the vtable based technique can waste memory since each class has a vtable whether or not any of the class's functions are invoked. Moreover, if there are a large number of classes that override the functions of other classes, vtables can become quite large.

SUMMARY

In general, in one aspect, embodiments of the invention feature locating a function call site in a code segment of a running application. The code segment includes a plurality of instructions. The call site is the location of an invocation of a function and including a first reference, the first reference being a reference to a first dispatcher. The call site in the code segment is modified by replacing the first reference with a second reference, the second reference being a reference to second dispatcher, the second dispatcher different from the first dispatcher.

These and other embodiments can optionally include one or more of the following features. A dispatcher can be a reference to the function. A dispatcher can be a reference to a cache-based dispatcher that is capable of invoking the function. A dispatcher can be a reference to a table-based dispatcher that is capable of invoking the function. The function can be monomorphic or polymorphic. The code segment can be part of a dynamically linked library. The locating is performed in response to incorporating a new code segment into the application at run time. The locating is performed in response to determining that the function is invoked frequently. The locating is performed in response to detecting that the function is polymorphic. The locating is performed in response to detecting that the function is monomorphic.

In general, in another aspect, embodiments of the invention feature locating a function call site in a code segment of a running application. The code segment includes a plurality of instructions. The call site is a location of an invocation of a polymorphic function through a first polymorphic function dispatcher. The call site is modified so that invocation of the function is performed through a second polymorphic dispatcher different from the first polymorphic dispatcher.

These and other embodiments can optionally include one or more of the following features. A dispatcher can be a reference of to a cache-based dispatcher that is capable of invoking the function. A dispatcher can be a reference of to a table-based dispatcher that is capable of invoking the function.

In general, in another aspect, embodiments of the invention feature detecting in a running application that a monomorphic function has become polymorphic, or that a polymorphic function has become monomorphic. If the changed function is no longer monomorphic, modifying one or more call sites for the changed function so that invocation of the function is performed through a polymorphic dispatcher. If the changed function is no longer polymorphic, modifying the one or more call sites for the changed function so that invocation of the function is performed directly or through a monomorphic dispatcher.

These and other embodiments can optionally include one or more of the following features. A dispatcher can be a reference to the function. A dispatcher can be a reference to a cache-based dispatcher that is capable of invoking the function. A dispatcher can be a reference to a table-based dispatcher that is capable of invoking the function. The detecting is performed in response to incorporating a new code segment into the application at run time. The detecting is performed in response to determining that the function is invoked frequently. The detecting is performed in response to incorporating a new code segment into the application at run time.

Particular embodiments of the invention can be implemented to realize one or more of the following advantages. Frequently called functions that are invoked using a cache-based dispatching technique are dynamically switched at runtime to a vtable-based technique to improve performance. A function's dispatching method can be also be changed to a cache-based technique to save memory. For a given function, a time/space tradeoff can be made when determining the appropriate dispatcher to invoke the function. Monomorphic functions utilizing a cache-based dispatching technique can be dynamically switched at runtime to be directly invoked to improve performance. When a monomorphic function becomes polymorphic at runtime, the dispatching technique used to invoke the function can be dynamically changed to a polymorphic technique. When a polymorphic function becomes monomorphic at runtime, the dispatching technique used to invoke the function can be dynamically changed to a monomorphic technique. Changing dispatching techniques for a given function does not require any code to be emitted. The dispatching technique for a function invoked in a dynamic link library can be changed dynamically at runtime. Function invocation patterns can be monitored at runtime in order to identify frequently called functions and alter their dispatching technique.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 4A:
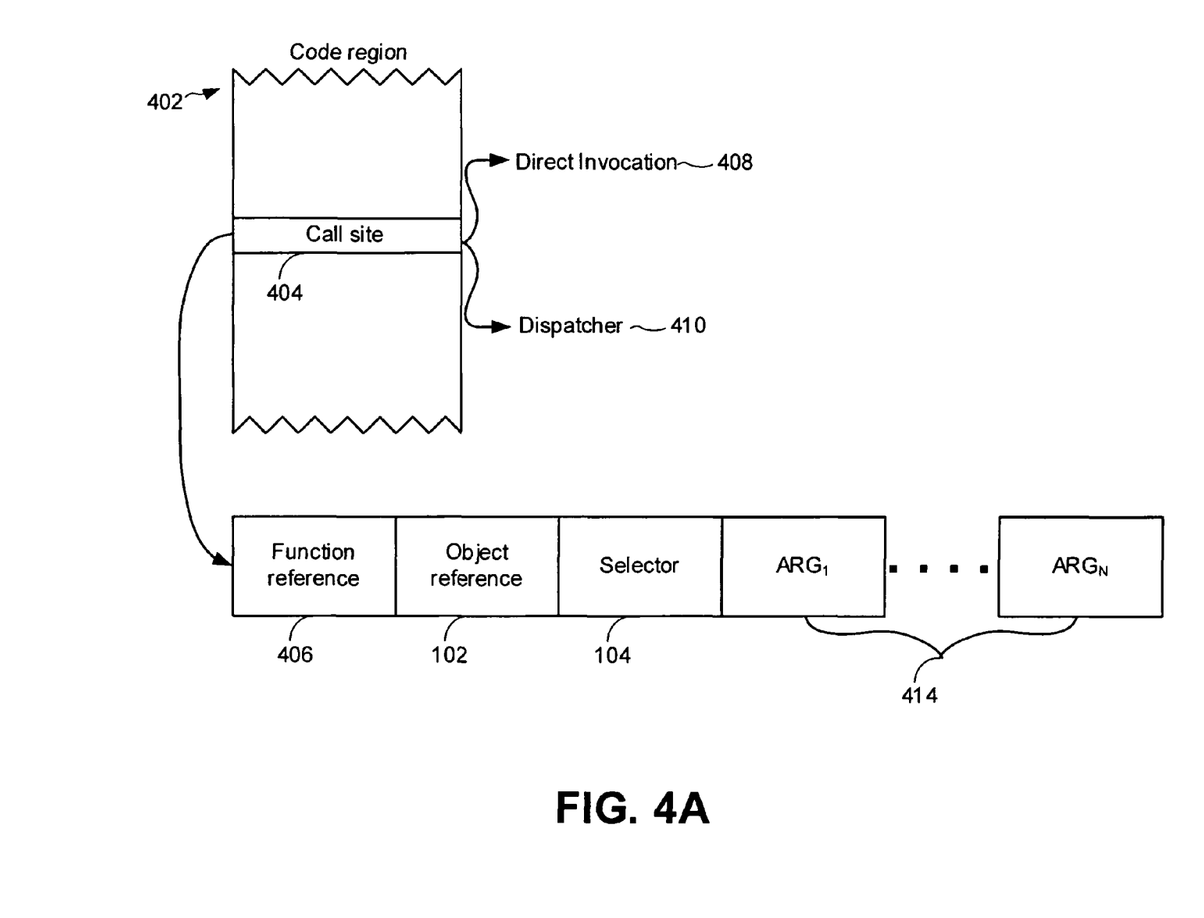
FIG. 4A illustrates a function call site.

FIG. 4A illustrates a function call site. A call site (e.g., 404) is a region in a code segment 402 where a function is invoked.

For example, a call site in the case of an Objective-C application would minimally include an object reference and a selector. In the case of a C++ application, the call site would minimally include a vtable reference and an offset. A code segment can have one or more call sites for one or more function invocations.

The code segment 402 can be of the form of compiled source code that incorporates one or more instructions which can be executed directly (e.g., machine code) or indirectly (e.g., instructions for an interpreter) by one or more computing devices sequentially or in parallel. A running application program can have one or more code segments. A code segment can also be dynamically incorporated into an application such as by way of a dynamic link library (DLL).

In one implementation, the call site includes one or more instructions to call a function. The call site 404 allows for monomorphic invocation 408 of a target function such as through one or more instructions which invoke the target function directly using a reference to the target function. Alternatively, a target function can be invoked indirectly through one or more instructions which invoke a dispatcher function 410 that can use one or more dispatching techniques such as, but not limited to, one of the prior art polymorphic dispatching techniques described above. In one implementation, a call site can include one or more of the following (in no particular order): a function reference 406, an object reference 102, a selector 104 and zero or more function arguments 414.

In one implementation, the function reference 406 is a reference to the target function or to a dispatcher function. The object reference 102 can be a reference to the object that the function is being invoked on (e.g., a reference to a class instance). The selector 104 identifies the target function, as discussed above. The invoked function can access other information in the call site through a stack reference, one or more registers, or other suitable means. For example, in an Objective-C application a call site could contain a compiled version of the following code:

objc_msgSend(object reference, selector, arg1, . . . , argn)

Call sites can be modified dynamically at application runtime. In one implementation, call site modification can be performed by changing the function reference 406 to be a reference of a preferred dispatcher function or the target function itself. An advantage of this approach to modifying call sites is that code is not required to be emitted.

Figure 4B:
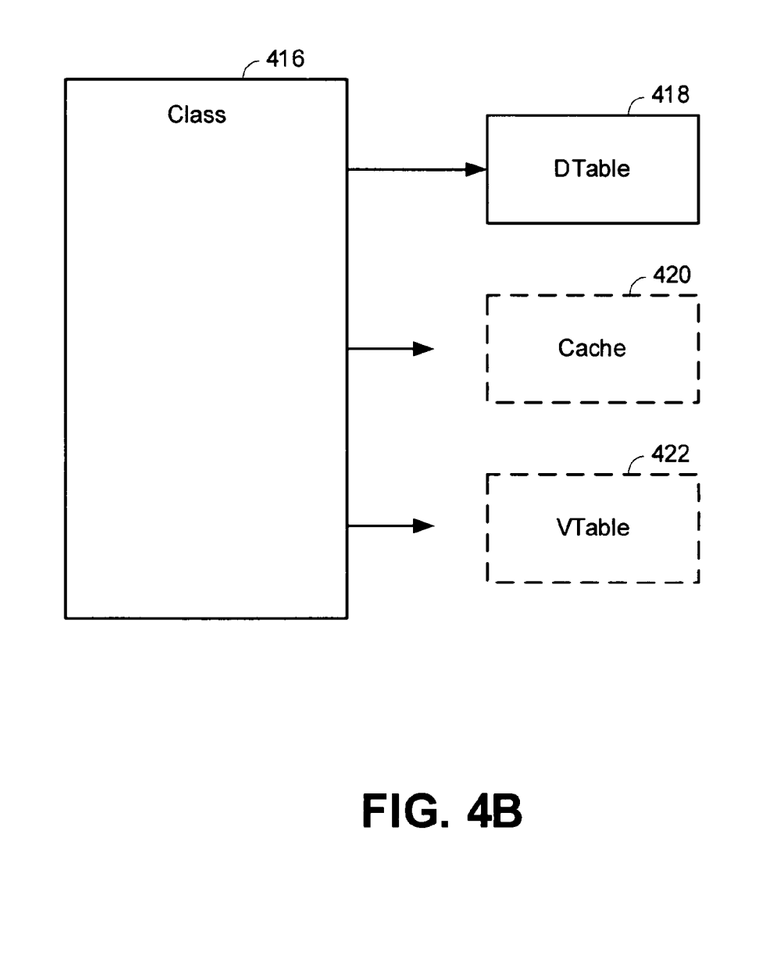
FIG. 4B illustrates a runtime class that is compatible with multiple dispatching techniques.

FIG. 4B illustrates a runtime class 416 that is compatible with multiple dispatching techniques. In one implementation, the class 416 includes a dtable 418, an optional function reference cache 420, and an optional vtable 422. Each of the class 416's one or more methods can use any of the dispatching techniques described above. The vtable 422 can be used with vtable-based dispatching techniques and can be created dynamically when it is first needed to invoke one or more of the class 416's function(s). Likewise, the cache 420 can be used with cache-based dispatching techniques and can be created dynamically when it is first needed to invoke one or more of the class 416's function(s). If the class 416's functions are no longer invoked using cache-based (vtable-based) dispatching techniques, the cache 420 (vtable 422) can be deallocated. Alternatively, the cache 420 and the vtable 422 be created by default for each class at runtime, regardless of the dispatching techniques used.

Figure 5:
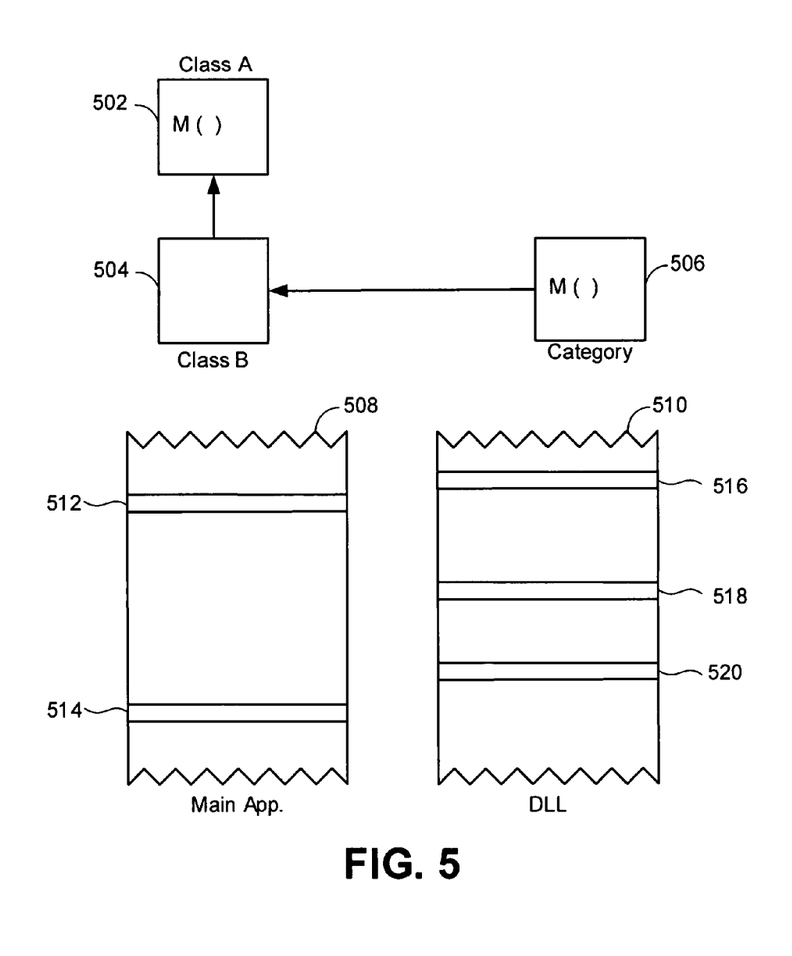
FIG. 5 illustrates runtime addition and removal of a function implementation.

FIG. 5 illustrates runtime addition and removal of a function implementation. At runtime, function definitions and subclasses can be added to and removed from class definitions. For example, in the Objective-C language, a running application can be linked with new functions that are defined as categories in external files (e.g., a DLL). For example, class A 502 in a running application defines a function m 502 and has a subclass B 504 which does not define m. Therefore, m is a monomorphic function. If a category 506 including a definition of the function m for class B 504 is loaded into the running application, the class B 504 will include the category's definition of m, making the function m polymorphic.

A main application code segment 508 and a DLL code segment 510 contain call sites for the function m (512, 514, 516, 518 and 520). The call sites can be modified at runtime to change the technique used to invoke m, as described above. For example, if the function m becomes polymorphic, m's call sites can be modified to invoke a polymorphic dispatcher by changing the function reference 406 to the a polymorphic dispatcher function. Similarly, if the category 506 is removed at runtime, m will become monomorphic once again. The dispatching technique used in m's call sites can then be changed back to using a monomorphic dispatching technique. In one implementation, a dispatcher function can implement multiple dispatching techniques, determining which one to use based on the function being invoked other information.

Figure 6:
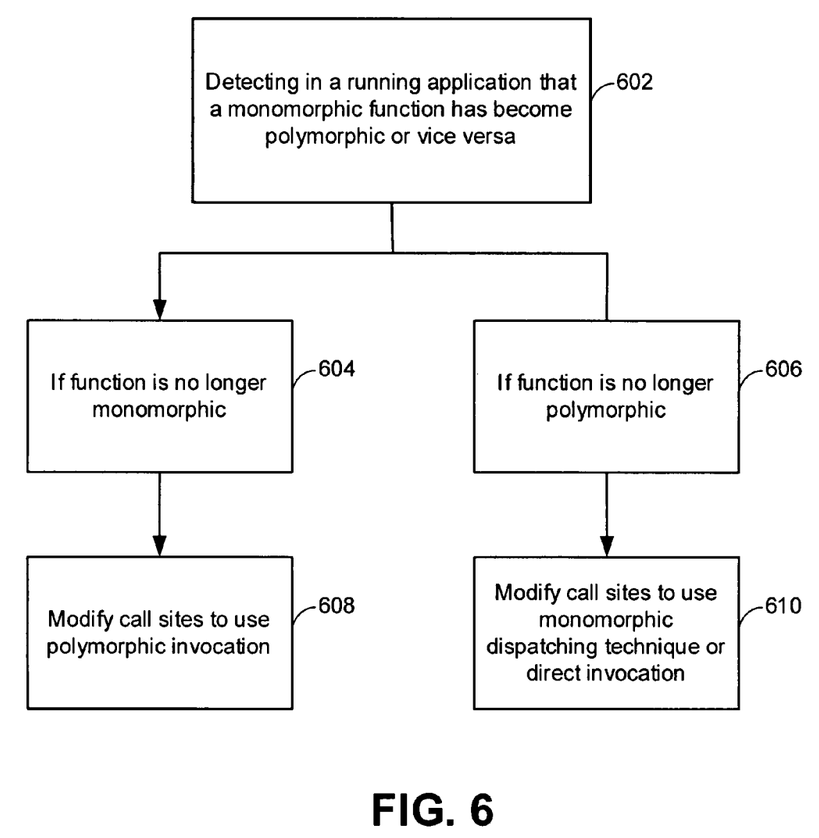
FIG. 6 is a flow diagram illustrating changing of the dispatching technique for a function based on whether the function is polymorphic or monomorphic.

FIG. 6 is a flow diagram illustrating an approach for changing the dispatching technique for a function based on whether the function is polymorphic or monomorphic. At runtime, a function definition changing from monomorphic to polymorphic, or vice versa, is detected (step 602). For example, this can be a result of dynamically loading or unloading a function definition (e.g., through a category). If the function is no longer monomorphic (step 604), the function's call sites in all code segments are modified to use a polymorphic dispatching technique (step 608), as described above. If the function is no longer polymorphic (step 606), the function's call sites in all code segments are modified to use a monomorphic dispatching technique or direct invocation (step 610).

Figure 7:
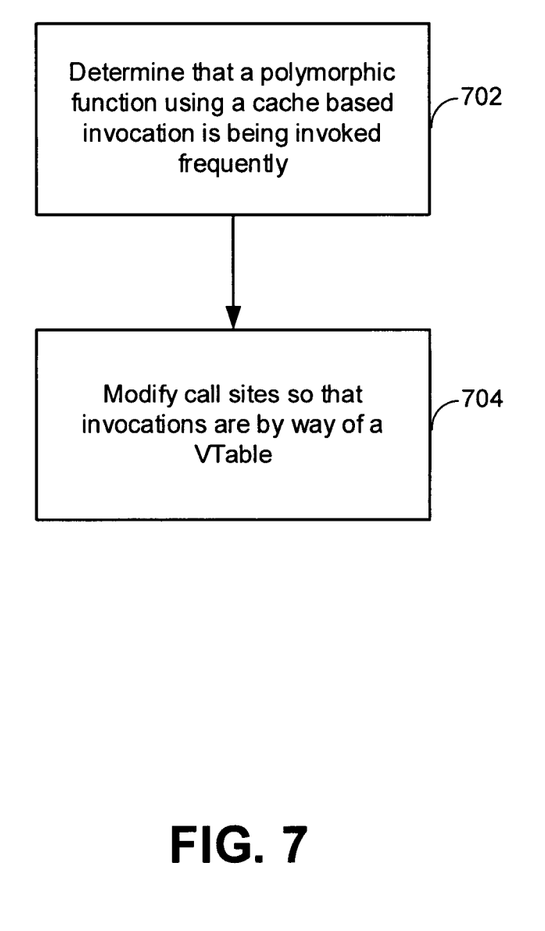
FIG. 7 is a flow diagram illustrating changing of the dispatching technique for a polymorphic function.

FIG. 7 is a flow diagram illustrating an approach for changing the dispatching technique for a polymorphic function at runtime. For example, if a function is being called frequently, it is desirable to use a more time efficient dispatching technique. During runtime, a process determines that a function is being called (or will be called) too frequently (step 702). This determination can be based on empirical data collected during previous runs of the application or during the current run, such as the number of times the function is called within a given time period. Commercially available application profiling tools can be used to collect functional invocation information. In one implementation, function invocation information can be obtained by sampling a running application over time so as not to negatively impact the performance of the application. A frequently called function's call sites can be modified to use a more time efficient dispatcher, such as the vtable-based dispatching technique described above (step 704).

Figure 8:
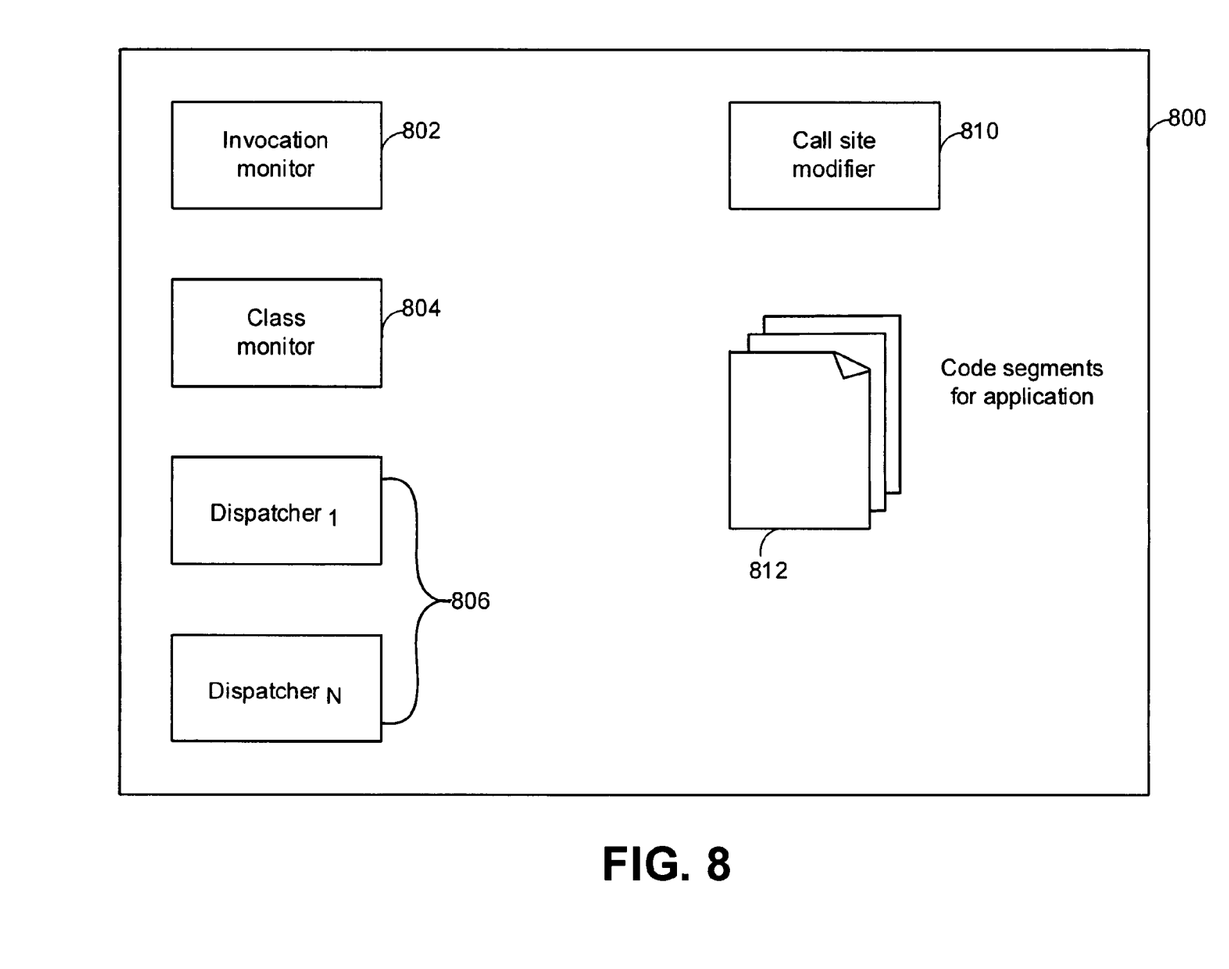
FIG. 8 is a system diagram of an application at runtime.

FIG. 8 is a system diagram of an application 800 at runtime. The application 800 can be multithreaded and can execute on one or more computing devices connected by one or more wired or wireless networks. The application 800 incorporates one or more code segments 812 and one or more dispatcher functions 806. In one implementation, the code segments include the main application code as well as code for the runtime components (802, 804, 806 and 810). In one implementation, the runtime components are objects or functions that can optionally execute in, for example, their own application-level threads. An invocation monitor 802 determines whether to switch the dispatching technique used for a given function based on how frequently the function is invoked (see FIG. 7). The invocation monitor 802 can determine whether to switch the dispatching technique for a given function when the application 800 initializes (e.g., based on a previous determination) or anytime after the application 800 initializes. The invocation monitor 802 utilizes the call site modifier 810 to change the dispatching technique for the affected call sites in the code segments 812 by changing the function reference 406 at the call sites.

In one implementation, a class monitor 804 monitors when function definitions are added to or removed from classes. If a monomorphic function becomes polymorphic, or vice versa, the dispatcher for the function can be changed as described above (see FIG. 6) using the call site modifier 810. Each dispatcher 806 can implement one or more dispatching techniques. For example, one dispatcher could implement a cache-based technique, another could implement a vtable-based technique, and yet another could implement both techniques. In the later case, the dispatcher can determine which technique to use based on information available at the call site.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable device, e.g., a machine-readable storage device, storage medium, or memory device, or multiple ones of them; or it can be a tangible machine-readable propagated signal. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Information carriers suitable for storing computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Particular embodiments of the invention have been described. Other embodiments are within the scope of the following claims. For example, the actions recited in the claims can be performed in a different order and still achieve desirable results.

What is claimed is:

1. A computer implemented method, comprising:
    locating a call site of a function in a code segment of a running application, the code segment including a plurality of instructions, the call site being the location of an invocation of the function and including a first reference, the first reference being a reference to a polymorphic dispatcher; and
    detecting a dynamic unloading of a function definition of the function; and
    in response to detecting, modifying the call site in the code segment including replacing the first reference with a second reference, the second reference being a reference to a monomorphic dispatcher.

2. The computer implemented method of claim 1, where: the monomorphic dispatcher is a reference to the function.

3. The computer implemented method of claim 1, where: the polymorphic dispatcher is a reference to a cache-based dispatcher that is capable of invoking the function.

4. The computer implemented method of claim 1, where: the polymorphic dispatcher is a reference to a table-based dispatcher that is capable of invoking the function.

5. The computer implemented method of claim 1, where: the function definition is part of a dynamically linked library.

6. A non-transitory computer-readable medium including one or more sequences of instructions which, when executed by one or more processors, causes:
    locating a call site of a function in a code segment of a running application, the code segment including a plurality of instructions, the call site being the location of an invocation of the function and including a first reference, the first reference being a reference to a polymorphic dispatcher; and
    detecting a dynamic unloading of a function definition of the function; and
    in response to detecting, modifying the call site in the code segment including replacing the first reference with a second reference, the second reference being a reference to a monomorphic dispatcher.

7. The non-transitory computer-readable medium of claim 6, where the monomorphic dispatcher is a reference to the function.

8. The non-transitory computer-readable medium of claim 6, where the polymorphic dispatcher is a reference to a cache-based dispatcher that is capable of invoking the function.

9. The non-transitory computer-readable medium of claim 6, where the polymorphic dispatcher is a reference to a table-based dispatcher that is capable of invoking the function.

10. The non-transitory computer-readable medium of claim 6, where the function definition is part of a dynamically linked library.

11. A system comprising:
    one or more processors; and
    a non-transitory computer-readable medium including one or more sequences of instructions which, when executed by one or more processors, causes:
        locating a call site of a function in a code segment of a running application, the code segment including a plurality of instructions, the call site being the location of an invocation of the function and including a first reference, the first reference being a reference to a polymorphic dispatcher; and
        detecting a dynamic unloading of a function definition of the function; and
        in response to detecting, modifying the call site in the code segment including replacing the first reference with a second reference, the second reference being a reference to a monomorphic dispatcher.

12. The system of claim 11, where the monomorphic dispatcher is a reference to the function.

13. The system of claim 11, where the polymorphic dispatcher is a reference to a cache-based dispatcher that is capable of invoking the function.

14. The system of claim 11, where the polymorphic dispatcher is a reference to a table-based dispatcher that is capable of invoking the function.

15. The system of claim 11, where the function definition is part of a dynamically linked library.

* * * * *